(12) United States Patent
Blacha et al.

(10) Patent No.: US 10,870,488 B2
(45) Date of Patent: Dec. 22, 2020

(54) BRACED WING AIRCRAFT

(71) Applicant: AIRBUS HELICOPTERS DEUTSCHLAND GMBH, Donauworth (DE)

(72) Inventors: Martin Blacha, Donauworth (DE); Axel Fink, Donauworth (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 100 days.

(21) Appl. No.: 16/154,010

(22) Filed: Oct. 8, 2018

(65) Prior Publication Data

US 2019/0152603 A1    May 23, 2019

(30) Foreign Application Priority Data

Nov. 20, 2017 (EP) .................................... 17400068

(51) Int. Cl.
*B64C 3/18* (2006.01)
*B64C 39/06* (2006.01)

(52) U.S. Cl.
CPC ............ *B64C 39/068* (2013.01); *B64C 3/185* (2013.01)

(58) Field of Classification Search
CPC ............................... B64C 39/068; B64C 3/185
USPC ....................................................... 244/45 R
See application file for complete search history.

(56) References Cited

U.S. PATENT DOCUMENTS

| 4,053,125 A * | 10/1977 | Ratony ................. B64C 39/068 244/46 |
| 4,090,681 A * | 5/1978 | Zimmer ................ B64C 39/068 244/45 R |
| 4,146,199 A * | 3/1979 | Wenzel ................ B64C 39/068 244/36 |
| 4,365,773 A * | 12/1982 | Wolkovitch .......... B64C 39/068 244/123.7 |
| 4,856,736 A * | 8/1989 | Adkins ................. B64C 39/068 244/45 R |
| 5,046,684 A | 9/1991 | Wolkovitch |

(Continued)

FOREIGN PATENT DOCUMENTS

| EP | 0716978 A1 * | 6/1996 | ............ B64C 39/068 |
| EP | 2690011 A1 | 1/2014 | |

(Continued)

OTHER PUBLICATIONS

Ajith, V.S. et al., "Study of Optimal Design of Spar Beam for the Wing of an Aircraft", IJEDR, vol. 5, Issue 3 (2017) (Year: 2017).*

(Continued)

*Primary Examiner* — Claude J Brown
(74) *Attorney, Agent, or Firm* — Brooks Kushman P.C.

(57) ABSTRACT

A braced wing aircraft with a fuselage and a fixed wing arrangement, the fixed wing arrangement comprising at least two braced wings that are arranged laterally and opposite to each other on the fuselage, each one of the at least two braced wings comprising at least one upper wing and at least one lower wing which are staggered and interconnected at a predetermined transition region, the at least one upper wing being connected to the fuselage at an associated upper wing root and the at least one lower wing being connected to the fuselage at an associated lower wing root.

19 Claims, 4 Drawing Sheets

(56) References Cited

U.S. PATENT DOCUMENTS

| | | | |
|---|---|---|---|
| 5,503,352 A | 4/1996 | Eger | |
| 6,098,923 A * | 8/2000 | Peters, Jr. | B64C 3/16 |
| | | | 244/13 |
| 6,474,604 B1 * | 11/2002 | Carlow | B64C 39/062 |
| | | | 244/198 |
| 8,985,500 B2 * | 3/2015 | Borie | B64C 27/82 |
| | | | 244/17.11 |
| 2006/0102798 A1 * | 5/2006 | Cox | B64C 1/26 |
| | | | 244/190 |
| 2006/0144991 A1 * | 7/2006 | Frediani | B64C 39/068 |
| | | | 244/45 R |
| 2010/0200703 A1 * | 8/2010 | Cazals | B64C 39/068 |
| | | | 244/45 R |
| 2012/0074264 A1 * | 3/2012 | Heaton | B64C 3/385 |
| | | | 244/213 |
| 2013/0264428 A1 * | 10/2013 | Rouyre | B64C 37/00 |
| | | | 244/45 R |
| 2014/0061367 A1 | 3/2014 | Fink et al. | |
| 2017/0197709 A1 | 7/2017 | Fink et al. | |

FOREIGN PATENT DOCUMENTS

| | | |
|---|---|---|
| EP | 2772427 A1 | 9/2014 |
| EP | 2789534 A1 | 10/2014 |
| EP | 2886449 A1 | 6/2015 |
| EP | 3141478 A1 | 3/2017 |

OTHER PUBLICATIONS

European Search Report for European Application No. EP17400068, Completed by the European Patent Office, dated Jan. 23, 2018, 5 pages.

\* cited by examiner

BRACED WING AIRCRAFT

CROSS-REFERENCE TO RELATED APPLICATIONS

This application claims priority to European patent application No. EP 17400068.7 filed on Nov. 20, 2017, the disclosure of which is incorporated in its entirety by reference herein.

BACKGROUND OF THE INVENTION (1) Field of the Invention

The invention is related to a braced wing aircraft with a fuselage and a fixed wing arrangement that comprises at least two braced wings which are arranged laterally and opposite to each other on the fuselage.

(2) Description of Related Art

Aircrafts with braced wings, in particular with so-called box-wing or joined-wing configurations, are well known since a long time. Generally, such box-wing or joined-wing configurations are based on comparatively complex arrangements of main load carrying members, such as skins, ribs and spars, which are required to join respective upper and lower wings together in a sufficiently efficient manner.

However, when using upper and lower wings that are formed on the basis of conventional wing constructions and, more particularly, on the basis of conventional staggered braced wing configurations, usually plural kinks are formed in associated wing spars at least in the area of respective wing tips. This leads at least in configurations with propellers or engines resp. propulsion units which are mounted at the respective wing tips to an increased constructional complexity.

More generally, the challenge of such configurations is to provide an efficient structure in terms of load continuity of associated main load carrying members of both wings, i.e. the upper and lower wings, at a respective wing interconnection region. Furthermore, a comparatively simple integration of a propeller or engine resp. propulsion unit into the respective wing interconnection region as well as of a resulting overall wing assembly is required. In particular, a safe and efficient wing interaction between the upper and lower wings at the respective wing interaction region with maximum stiffness of the entire braced wing construction should be enabled.

However, in lightweight designs every kink leads to a deviation in a given load path, which usually needs to be supported by additional ribs in order to guarantee a required stiffness and strength. These additional ribs, nevertheless, cause additional weight, additional cost, additional fatigue sensitivity, a requirement of associated fasteners and, therefore, increase complexity of an already complex wing configuration.

Furthermore, in case of an installation of a propeller or engine resp. propulsion unit into the respective wing interconnection region, i.e. in the area of the respective wing tips, the spars of the upper and lower wings need to provide support for the propeller or engine resp. propulsion unit. In fact, its supports are generally driven by an underlying wing stiffness. Nevertheless, due to associated interface areas at the respective wing interconnection region and a cut of the main load carrying members, the main load path is comparatively inefficient.

One consequence of the above-described critical design matters is that, although box-wing or joined-wing configurations are well known, their practical application is very limited and, thus, there are only limited examples available for aircrafts with improved wing configurations. This is even more valid for aircrafts with box-wing or joined-wing configurations having propellers or engines resp. propulsion units in the vicinity of the respective wing tips, i.e. in the respective wing interconnection regions.

An exemplary braced wing aircraft is e.g. described in the document U.S. Pat. No. 5,046,684 A. More specifically, the latter describes a tiltrotor aircraft with a fuselage and a fixed wing arrangement. On each side of the fuselage a first and a second wing are arranged. The first wing is fixed substantially at the bottom of the fuselage and the second wing is fixed substantially at the top of the fuselage, or fixed to a structure extending above the fuselage. At least one of the first and second wings has dihedral so that the wings converge to join or nearly join at their tips. Furthermore, unducted rotor means are provided for generating aerodynamic lift sufficient for highly efficient hovering flight and for propelling the tiltrotor aircraft at speeds approaching roughly four hundred knots in forward cruising flight. The unducted rotor means are supported on the first and second wings, at or near the tips of the first and second wings. They can be pivoted for operation in different orientations in hovering and forward flight respectively.

In other words, according to the document U.S. Pat. No. 5,046,684 A, the tiltrotor aircraft features a fixed wing arrangement, wherein the lower, i.e. first wing is straight and positively swept, and wherein the upper, i.e. second wing is straight and exhibits a very pronounced negative sweep. The upper wing is anhedral and connects the tip of the lower wing of the fixed wing arrangement to the tip of the tiltrotor aircraft's fin.

The document EP 2 690 011 A1 describes a braced wing aircraft in the form of a compound helicopter with a fixed wing arrangement in the form of a joined-wing configuration, wherein a lower wing and an upper wing are provided on each side of the compound helicopter. Both wings are essentially straight and interconnected to each other at a wing interconnection region, and a pusher propeller is installed in the interconnection region behind associated trailing edges of both wings.

The document EP 3 141 478 A1 describes another braced wing aircraft in the form of a compound helicopter with a fuselage and at least one main rotor that is at least adapted for generating lift in operation. The fuselage comprises a lower side and an upper side that is opposed to the lower side. The at least one main rotor is arranged at the upper side. At least one propeller is provided that is at least adapted for generating forward thrust in operation, the at least one propeller being mounted to a fixed wing arrangement that is laterally attached to the fuselage. The fixed wing arrangement comprises at least one upper wing that is arranged at an upper wing root joint area provided at the upper side of the fuselage and at least one lower wing that is arranged at a lower wing root joint area provided at the lower side of the fuselage. The upper and lower wings are at least interconnected at an associated interconnection region. The lower wing comprises an inboard section defining a first quarter chord line and a first centroidal axis and an outboard section defining a second quarter chord line and a second centroidal axis. The second centroidal axis is inclined relative to the first centroidal axis by a relative dihedral angle that is defined in a first coordinate plane. The second quarter chord line is inclined relative to the first quarter chord line by a relative sweep angle that is defined in a second coordinate plane. The inboard section is connected to the fuselage at the lower wing root joint area and to the outboard section at a sections interconnection region. The outboard section is connected to the inboard section at the sections interconnection region and to the upper wing at the associated interconnection region. More specifically, the outboard section comprises wing spars and the fuselage is provided with wing attachment frames. A hinged joint or clamped joint connects the wing spars to the wing attachment frames.

It should be noted that the above described documents are only described by way of example and that there is a big variety of documents that are related to the topic of braced wing aircrafts with box-wing or joined-wing configurations, respectively, but they mainly describe either an underlying aerodynamic configuration, a given arrangement of upper and lower wings, and/or a pure design architecture of such wing configurations. Exemplary documents are the documents U.S. Pat. Nos. 5,503,352 A and 4,365,773 A.

However, in all of these well-known braced wing aircrafts, a respective arrangement of structural items and members is either undefined or unclear. In fact, if there is information available, as e.g. in the documents U.S. Pat. No. 5,046,684 A and/or U.S. Pat. No. 5,503,352 A, then there is no specific description of a respective arrangement of an underlying internal structure of spars and an improvement with respect to a provided load transfer or force flow, respectively. Otherwise, due to the fact that occurring lifting forces on given wing surfaces in a box-wing configuration are vertical, respective designs, such as e.g. described in the document U.S. Pat. No. 4,365,773 A, still only present a conventional orientation of spars themselves, i.e. vertical, and do neither describe an underlying interconnection of respective upper and lower wings at respective wing interconnection regions, nor their structure resp. mechanical arrangement as a whole. More particularly, all above-described prior art documents do not describe internal constructions of respective braced wings, in particular in box-wing or joined-wing configurations, or they e.g. merely show spars but do not reveal that there are structure-mechanic issues with associated wing interconnection regions and attachment areas of the braced wings to a given fuselage, or with respect to propellers and engines resp. propulsion units that are mounted to the associated wing interconnection regions.

It should be noted that, by way of example, the documents EP 2 789 534 A1 and EP 2 772 427 A1 describe internal arrangements of spars in aircraft wings, which may be referred to as "multi-box-wing" designs. However, these "multi-box-wing" designs are merely described with respect to aircrafts having singular wings, so that the described "multi-box-wing" designs are not provided with any wing interconnection regions that are required for implementing box-wing or joined-wing configurations in braced wing aircrafts.

The documents U.S. Pat. No. 4,090,681, US2017197709, US2014061367 and EP2886449 have also been considered.

BRIEF SUMMARY OF THE INVENTION

It is, therefore, an object of the present invention to provide a new braced wing aircraft with braced wings that respectively comprise at least two staggered and interconnected dependent singular wings and exhibit an improved structure-mechanic behavior.

This object is solved by a braced wing aircraft with a fuselage and a fixed wing arrangement, the fixed wing arrangement comprising at least two braced wings that are arranged laterally and opposite to each other on the fuselage, the braced wing aircraft comprising the features of claim 1.

More specifically, according to the present invention a braced wing aircraft with a fuselage and a fixed wing arrangement is provided. The fixed wing arrangement comprises at least two braced wings that are arranged laterally and opposite to each other on the fuselage. Each one of the at least two braced wings comprises at least one upper wing and at least one lower wing which are staggered and interconnected at a predetermined transition region. The at least one upper wing is connected to the fuselage at an associated upper wing root and the at least one lower wing is connected to the fuselage at an associated lower wing root. The at least one upper wing comprises at least one upper wing spar that extends from the associated upper wing root to the predetermined transition region. The at least one lower wing comprises at least one lower wing spar that extends from the predetermined transition region to the associated lower wing root. At least one transition spar is provided at the predetermined transition region. The at least one transition spar connects the at least one upper wing spar to the at least one lower wing spar. The at least one upper wing spar, the at least one lower wing spar, and the at least one transition spar are arranged in a single virtually spanned spars plane that is inclined with respect to a vertical aircraft axis.

Advantageously, a braced wing aircraft with braced wings having a "straightened" internal architecture can be provided in a way that any structural kinks and their associated load path deviations can be avoided entirely. This is achieved by defining a specific structural wing arrangement which comprises suitable working-planes that are defined by respective attachment points of the braced wings, respectively their wing roots, and associated interconnection points of respective wing spars at the predetermined transition region. These working-planes advantageously define a minimum kink design which is, from a structure-mechanic point of view, very stiff and, thus, provides an improved support for a propulsion device mounted to the predetermined transition region.

According to one aspect, the braced wings of the inventive braced wing aircraft are provided with a particular box-wing respectively joined-wing configuration, wherein a main mechanical system is defined by respective attachment points of associated upper and lower wings to the fuselage. An underlying axis defined by these attachment points for corresponding front and rear spars in the upper and lower wings serves as a base for the wing attachment. The attachment points of the upper and lower wings are respectively provided at associated upper and lower wing roots.

Preferably, in a basic design of a respective front spar arrangement, a given web of a respective upper wing front spar is tilted to this axis as well as the lower wing front spar in a way that a virtually spanned front spars plane can be established by these webs which extend in spanwise direction of the upper and lower wings. Preferentially, an at least similar rear spar arrangement is provided for the upper wing rear spar and the lower wing rear spar so that a virtually spanned rear spars plane can be defined for the interconnected rear spars. The virtually spanned front spars plane and the virtually spanned rear spars plane may advantageously be defined according to underlying sweep angles of the upper and lower wings and are preferably arranged such that a given distance between the virtually spanned front spars plane and the virtually spanned rear spars plane is maximized in order to provide a maximum possible stiffness to a given braced wing.

It should be noted that the virtually spanned front spars plane and the virtually spanned rear spars plane must not necessarily be arranged in parallel. In fact, their orientation and arrangement relative to each other can be chosen arbitrarily and according to a respective individual need of a required aerodynamic configuration of the upper and lower wings. However, a main characteristic is that the front and rear spars of the upper and lower wings define a plane sectional cut through the braced wing.

More specifically, according to one aspect the front spars of the upper and lower wings and an associated front transition spar between the front spars of the upper and lower wings extend in one and the same single plane, i.e. the virtually spanned front spars plane. Accordingly, no kink is present in the virtually spanned front spars plane and a correspondingly defined entire front spar and front transition spar unit operates as a mechanical unit within the virtually spanned front spars plane. The individual spars, i.e. the front spars in the upper and lower wings and the associated front transition spar can either be implemented as an integral component in one piece, or as individual components that are mechanically fastened to each other by means of continuous and/or singular joins, such as hinges.

Likewise, according to one aspect the rear spars of the upper and lower wings and an associated rear transition spar between the rear spars of the upper and lower wings also extend in one and the same single plane, i.e. the virtually spanned rear spars plane. Accordingly, no kink is present in the virtually spanned rear spars plane and a correspondingly defined entire rear spar and rear transition spar unit operates as a mechanical unit within the virtually spanned rear spars plane. The individual spars, i.e. the rear spars in the upper and lower wings and the associated rear transition spar can either be implemented as an integral component in one piece, or as individual components that are mechanically fastened to each other by means of continuous and/or singular joins, such as hinges.

In more advanced configurations, also an underlying number of correspondingly provided front and/or rear spar arrangements can be adapted as required. In other words, preferably there is at least one such front and/or rear spar arrangement as described above, however, more than one front and/or rear spar arrangement may likewise be used. Even additional secondary spars may be integrated into each front and/or rear spar arrangement and, preferably, allocated at the virtually spanned front and/or rear spar planes. However, such additional secondary spars must not necessarily span over the whole length of one of the upper or lower wings.

Advantageously, the front and/or rear spar arrangements provide for an inclined position of associated spars with respect to a given chord line of each one of the upper and lower wings. In other words, in contrast to conventional wing arrangements, the spars are not oriented perpendicular to the chord line.

More specifically, due to the arrangement of the front spars and/or rear spars with the associated front/rear transition spars in associated virtually spanned front and rear spars planes, omission of any kinks can be achieved so that the entire underlying wing structure as such is comparatively stiff. In fact, each kink reduces an underlying stiffness of a wing, so that an increased stiffness may be obtained by avoiding kinks.

It should be noted that an increased stiffness is usually desired in wing architecture due to aeroelasticity. Thus, as any kink leads to a loss in stiffness of a lightweight structure or to additional weight, if the loss of stiffness must be compensated by additional structural items, the inventive arrangement in virtually spanned front and rear spars planes offers a very effective means for increasing stiffness. In fact, it should be noted that stiffness of a wings' structure is mostly a design driver and mass consumer. In particular, if propulsion devices are to be installed at respective wing tips, i.e. the predetermined transition regions, but more generally at any position of a given braced wing, the need for stiffness is even more important and, thus, by increasing the stiffness with the inventive braced wing architecture, becomes more advantageous.

Furthermore, if there are no kinks in the wing architecture respectively an underlying spar design, there is no need for additional ribs as they are required in conventional box-wing or joined-wing architectures for supporting the kinks. By avoiding such additional ribs, a respective number of constituent components can be reduced, thus, reducing cost and weight. Simultaneously, a simplification of the overall wing assembly can be achieved.

Furthermore, by inclining the spar webs, respectively the virtually spanned front and rear spars planes, an increase of a moment of inertia of the overall wing assembly in its weakest principle axis of inertia can be achieved. This is for box-wing or joined-wing configurations.

Furthermore, dependent on an underlying concept related to accounting e.g. for bird strike events, the inclination of the virtually spanned front and rear spars planes advantageously improves resistance in bird strike situations, as in such cases the birds advantageously only penetrate respective leading edges locally. Thus, a bird must e.g. not be stopped completely by the front spar which, instead, deviates the bird only according to its inclination angle. Accordingly, a lower amount of energy emanating from the bird strike must be dissipated by the spar web and on top the magnitude of the peak force during the bird strike is lower.

According to one aspect, the spar webs of the front and rear spars of the upper and lower wings are oriented diagonally, i.e. essentially in parallel to the main principle axis of the mechanical system of the braced wings and, thus, offers maximum stiffness since the entire web and caps of each one of the front and rear spars is at nearly the same maximum distance with respect to the principle axis with lowest moment of inertia, thereby taking maximum profit from the structural mass of all front and rear spar webs and caps. This allows avoiding local reinforcements at outermost corners of respective conventional box-wing configurations, which might be conveniently applied to maximize stiffness of respective braced wings in box-wing configurations with spars being perpendicularly oriented with respect to an underlying wing profile chord line, which is, however, complicated in manufacturing and costly as well. Thus, with the inventive braced wings, manufacturing time and costs may be reduced significantly.

In summary, the inventive braced wing aircraft is advantageous in that it is suitable to solve issues with respect to stiffness, architecture complexity, and number of structural supporting elements required for implementation of the braced wings. More specifically, the braced wings may be provided with an increased stiffness, a simplified architecture and a reduced number of structural supporting elements, such as additional ribs. Thus, a more lightweight braced wing can be designed, which also saves cost and a respective manufacturing time.

According to a preferred embodiment, the at least one upper wing spar, the at least one lower wing spar, and the at least one transition spar are integrated into a single one-piece component.

According to a further preferred embodiment, the at least one transition spar is integrated into only one of the at least one upper wing spar and the at least one lower wing spar into a single one-piece component.

According to a further preferred embodiment, the at least one upper wing spar and the at least one lower wing spar are rigidly mechanically attached to the at least one transition spar. This rigid attachment is preferably a hinged joint, with the hinge axis preferentially oriented perpendicular to the corresponding virtual spar plane, or a fully clamped joint.

According to a further preferred embodiment, the at least one upper wing and the at least one lower wing respectively comprise a chord line, wherein the single virtually spanned spars plane is inclined with respect to the chord line.

According to a further preferred embodiment, the at least one upper wing comprises an upper wing rear spar and an upper wing front spar. The at least one lower wing comprises a lower wing rear spar and a lower wing front spar. The at least one transition spar comprises a rear transition spar and a front transition spar.

According to a further preferred embodiment, the upper wing rear spar, the lower wing rear spar and the rear transition spar are arranged in a single virtually spanned rear spars plane that is inclined with respect to the vertical aircraft axis. The upper wing front spar, the lower wing front spar and the front transition spar are arranged in a single virtually spanned front spars plane that is inclined with respect to the vertical aircraft axis.

According to a further preferred embodiment, the single virtually spanned rear spars plane and the single virtually spanned front spars plane are arranged in parallel to each other.

According to a further preferred embodiment, the single virtually spanned rear spars plane and the single virtually spanned front spars plane are inclined with respect to each other.

According to a further preferred embodiment, the upper wing rear spar, the lower wing rear spar, the rear transition spar, the upper wing front spar, the lower wing front spar, and the front transition spar delimit a main load carrying center box of an associated one of the at least two braced wings.

According to a further preferred embodiment, the associated one of the at least two braced wings further comprises a leading portion and a trailing portion both of which are rigidly attached to the main load carrying center box.

According to a further preferred embodiment, the upper wing rear spar, the lower wing rear spar, the rear transition spar, the upper wing front spar, the lower wing front spar and the front transition spar are flat beams with closed webs.

According to a further preferred embodiment, the front transition spar and the rear transition spar are entirely or partly ring-shaped.

According to a further preferred embodiment, a propulsion device is arranged at the predetermined transition region.

According to a further preferred embodiment, the braced wing aircraft is embodied as a rotary wing aircraft with at least one main rotor.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
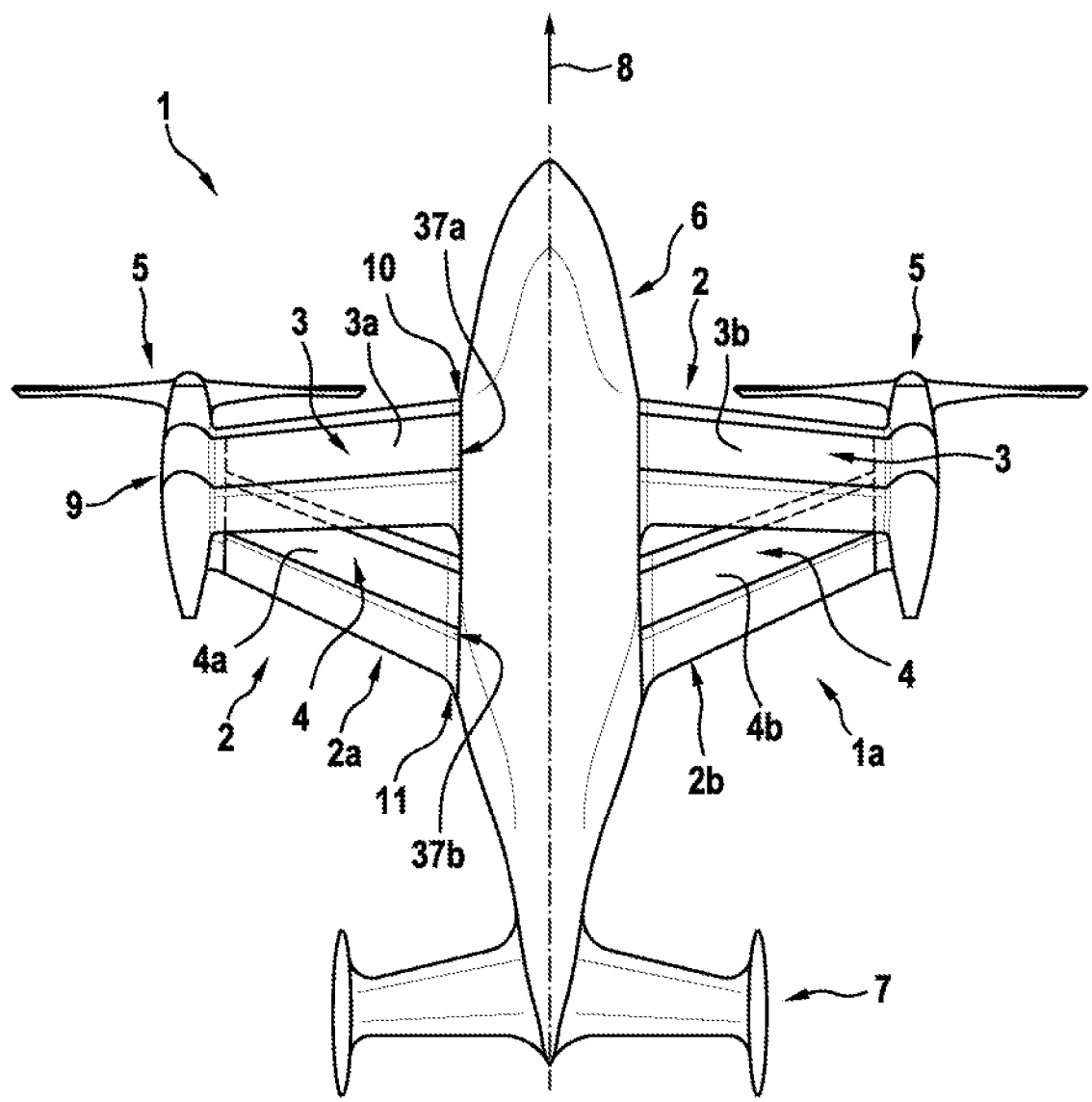
FIG. 1 shows a top view of a braced wing aircraft with braced wings according to the present invention.

FIG. 1 shows a braced wing aircraft 1 with a fixed wing arrangement 1a and a fuselage 6. The fixed wing arrangement 1a preferably comprises two or more braced wings 2 that are respectively provided with upper wings 3 and lower wings 4. Illustratively, the fixed wing arrangement 1a comprises a first braced wing 2a and a second braced wing 2b that are arranged laterally and opposite to each other on the fuselage 6. The first braced wing 2a is exemplarily mounted to a star board side of the braced wing aircraft 1 and the second braced wing 2b is exemplarily mounted to a board side of the braced wing aircraft 1.

According to one aspect, the braced wing aircraft 1 is provided with suitable propulsion devices 5 and an empennage 7. Illustratively, the propulsion devices 5 are embodied as puller propellers, but they may likewise be embodied as pusher propellers. Likewise, the propulsion devices 5 may be fixedly mounted or alternatively be embodied as tilted rotor assemblies. Preferably, the propulsion devices 5 are rigidly mounted at respective transition regions 9 of the braced wings 2a, 2b.

According to one aspect, each one of the braced wings 2a, 2b comprises at least one of the upper wings 3 and at least one of the lower wings 4 which are staggered and interconnected at an associated one of the transition regions 9. More specifically, the braced wing 2a illustratively comprises an upper wing 3a and a lower wing 4a which are staggered and interconnected at a first predetermined transition region 9 that is associated with the braced wing 2a. The braced wing 2b comprises an upper wing 3b and a lower wing 4b which are staggered and interconnected at a second predetermined transition region 9 that is associated with the braced wing 2b.

Preferably, each one of the upper wings 3a, 3b is connected to the fuselage 6 at an associated upper wing root 10 and each one of the lower wings 4a, 4b is connected to the fuselage 6 at an associated lower wing root 11. Each one of the upper wing roots 10 illustratively defines a transverse position 37a of the upper wing root 10 with respect to a longitudinal axis 8 of the braced wing aircraft 1. The transverse position 37a of the upper wing roots 10 and the transverse position 37b of the lower wing roots 11 are distant from each other resp. spaced apart in the longitudinal direction of the braced wing aircraft 1, i.e. in direction of the longitudinal axis 8. This distance resp. spacing apart of the transverse positions 37a, 37b defines a respective stagger of the upper wings 3 and the lower wings 4 at the wing roots 10, 11, so that the upper wings 3a, 3b and the lower wings 4a, 4b are said to be staggered.

By way of example, the braced wing aircraft 1 is embodied as an airplane. However, the braced wing aircraft 1 may likewise be embodied as a so-called convertiplane or as a rotary wing aircraft with at least one main rotor on top of the fuselage 6.

Figure 2:
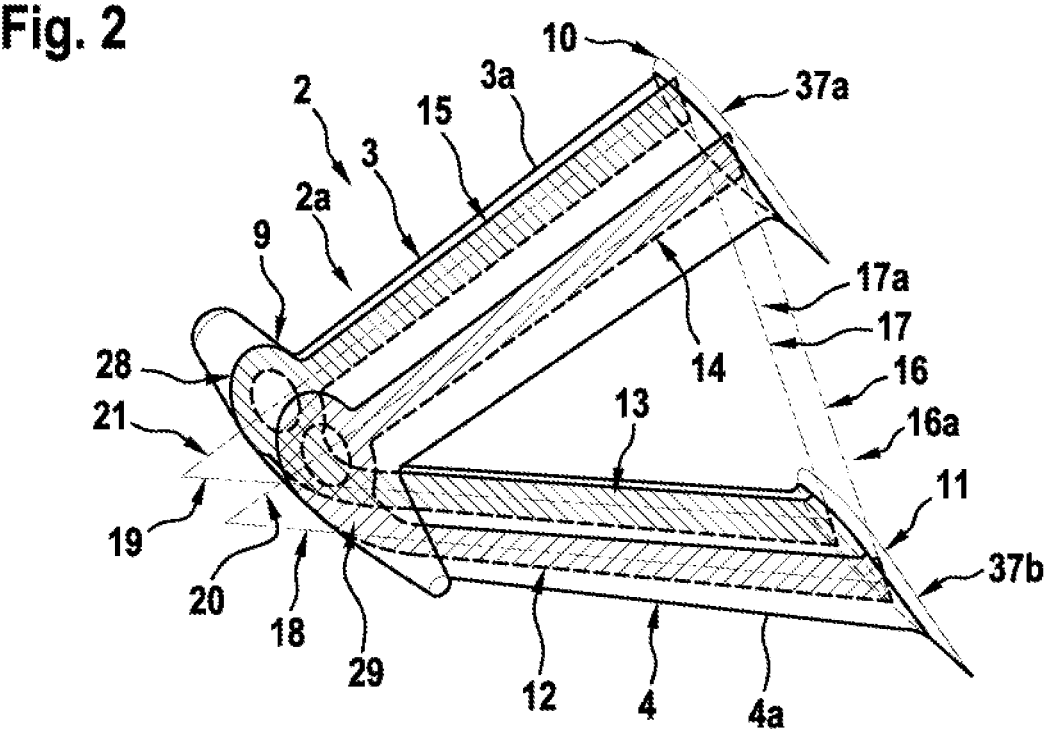
FIG. 2 shows a partly transparent, perspective view of one of the braced wings of FIG. 1 with a transition region according to one aspect.

FIG. 2 shows the braced wing 2a of the braced wings 2 of the braced wing aircraft 1 of FIG. 1 for further illustrating an exemplary internal constructional arrangement thereof. More specifically, an internal arrangement and construction of the upper wing 3a, the lower wing 4a as well as the respective predetermined transition region 9 of the braced wing 2a is described in more detail hereinafter. However, it should be noted that the braced wing 2a is only illustrated and described with reference to FIG. 2, as well as with reference to FIG. 3 to FIG. 6, by way of example and representative for each one of the braced wings 2a, 2b of FIG. 1 or any other one of the braced wings 2 of the braced wing aircraft 1 of FIG. 1.

According to one aspect, the upper wing 3a comprises at least one upper wing spar 14, 15 that extends from the upper wing root 10 to the predetermined transition region 9. Similarly, the at least one lower wing 4a preferably comprises at least one lower wing spar 12, 13 that extends from the predetermined transition region 9 to the associated lower wing root 11. Furthermore, preferably at least one transition spar 29, 28 is provided at the predetermined transition region 9. The at least one transition spar 29, 28 preferentially connects the at least one upper wing spar 14, 15 to the at least one lower wing spar 12, 13. According to one aspect, the at least one upper wing spar 14, 15, the at least one lower wing spar 12, 13, and the at least one transition spar 29, 28 are arranged in a virtually spanned spars plane 16a, 17a that is inclined with respect to a vertical aircraft axis (32 in FIG. 4).

More specifically, according to one aspect the upper wing 3a comprises an upper wing rear spar 14, and an upper wing front spar 15. The lower wing 4a illustratively comprises a lower wing rear spar 12 and a lower wing front spar 13. Preferably, the transition region 9 is provided with a front transition spar 28 and a rear transition spar 29. The front transition spar 28 preferably connects the upper wing front spar 15 to the lower wing front spar 13, and the rear transition spar 29 preferably connects the upper wing rear spar 14 to the lower wing rear spar 12 in the transition region 9.

According to one aspect, at least one of the upper wing rear and front spars 14, 15, an associated one of the lower wing rear and front spars 12, 13, and an associated one of the rear and front transition spars 29, 28 are integrated into a single one-piece component. Illustratively, the upper wing rear spar 14, the rear transition spar 29 and the lower wing rear spar 12 are integrated into a first single one-piece component, i.e. an integral component, and the upper wing front spar 15, the front transition spar 28 and the lower wing front spar 13 are likewise integrated into a second single one-piece component, i.e. an integral component.

However, it should be noted that such an exemplary one-piece integration of the upper wing rear and front spars 14, 15, the lower wing rear and front spars 12, 13 and the rear and front transition spars 29, 28 is merely described by way of example and not for limiting the invention thereto. Instead, at least one of the rear and front transition spars 29, 28 may be integrated into only one of the respective upper wing rear and front spars 14, 15 or the lower wing rear and front spars 12, 13 into a single one-piece component and only be attached rigidly mechanically to the other one of the lower wing rear and front spars 12, 13 or the upper wing rear and front spars 14, 15. By way of example, the rear transition spar 29 may be integrated into a single one-piece component with the lower wing rear spar 12 and only rigidly mechanically attached to the upper wing rear spar 14. Alternatively, the rear transition spar 29 could be integrated into a single one-piece component with the upper wing rear spar 14 and only be rigidly mechanically attached to the lower wing rear spar 12, and so on. The mechanical attachments between the single elements might be either a simple hinged joint, with the hinge axis preferably oriented perpendicular to the corresponding virtual spar plane, or a fully clamped joint.

However, it should be noted that likewise at least one of the respective front and/or rear transition spars 28, 29 may only be rigidly mechanically attached to the associated upper wing front or rear spar 15, 14 and to the associated lower wing front or rear spar 13, 12, without being integrated into a single one-piece component with one of the spars. In other words, e.g. the rear transition spar 29 may only rigidly mechanically attached to the upper wing rear spar 14 and to the lower wing rear spar 12.

Moreover, it should be noted that the possible interconnections between the upper wing front and rear spars 15, 14, the respective front and rear transition spars 28, 29 and the lower wing front and rear spars 13, 12 were merely described by way of example with respect to the lower wing rear spar 12, the upper wing rear spar 14 and the rear transition spar 29. However, the described configurations may likewise be applied to the upper wing front spar 15, the associated front transition spar 28 and the lower wing front spar 13.

According to one aspect, the lower wing rear spar 12, the upper wing rear spar 14 and the rear transition spar 29 are arranged in a single virtually spanned rear spars plane 16a. This single virtually spanned rear spars plane 16a is illustratively defined by a virtual connection line 16 between respective rear spar roots 10, 11 of the lower wing rear spar 12 and the upper wing rear spar 14, i.e. between the upper wing root 10 and the lower wing root 11, a lower wing rear spar centroidal axis 18 of the lower wing rear spar 12, and an upper wing rear spar centroidal axis 20 of the upper wing rear spar 14.

Likewise, the lower wing front spar 13, the upper wing front spar 15 and the front transition spar 28 are arranged in a single virtually spanned front spars plane 17a. The single virtually spanned front spars plane 17a is preferably defined by a virtual connection line 17 between respective front spar roots 10, 11 of the lower wing front spar 13 and the upper wing front spar 15, i.e. between the upper wing root 10 and the lower wing root 11, a lower wing front spar centroidal axis 19 that is defined by the lower wing front spar 13, and an upper wing front spar centroidal axis 21 that is defined by the upper wing front spar 15.

Figure 4:
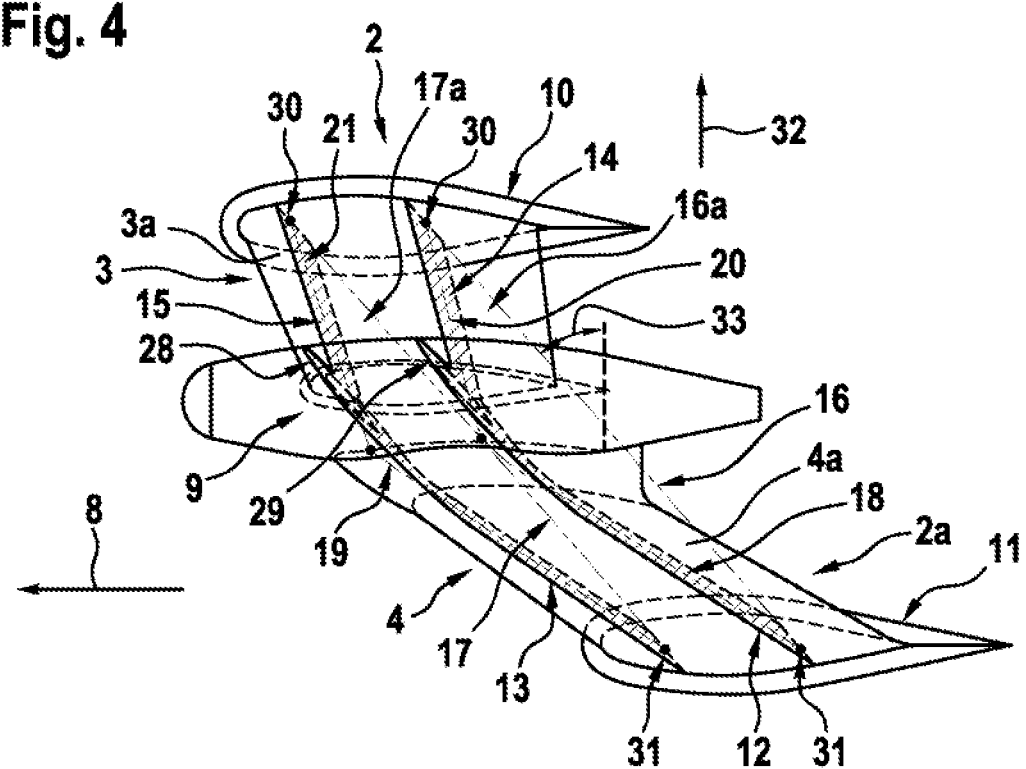
FIG. 4 shows a partly transparent, side view of the braced wing of FIG. 2, seen from the transition region.

Preferably, the single virtually spanned rear spars plane 16a is inclined with respect to the vertical aircraft axis (32 in FIG. 4). Likewise, the single virtually spanned front spars plane 17a is preferentially also inclined with respect to the vertical aircraft axis (32 in FIG. 4). This is a result of the staggered arrangement of the upper and lower wings 3a, 4a at their respective wing roots 10, 11.

According to one aspect, the single virtually spanned rear spars plane 16a and the single virtually spanned front spars plane 17a are arranged in parallel to each other. However, such a parallel arrangement is not mandatory and the single virtually spanned rear spars plane 16a and the single virtually spanned front spars plane 17a may alternatively be inclined with respect to each other.

Furthermore, according to one aspect the front and rear transition spars 28, 29 allow provision of a structural continuity of the upper wing front and rear spars 15, 14 to the associated lower wing front and rear spars 13, 12. Furthermore, by arranging the upper wing front and rear spars 15, 14, the associated lower wing front and rear spars 13, 12 and the structurally interconnecting front and rear transition spars 29, 28 respectively in associated single virtually spanned front and rear spars planes 17a, 16a, any kinks may be omitted, thus, enabling provision of increased stiffness of the arrangement.

Figure 3:
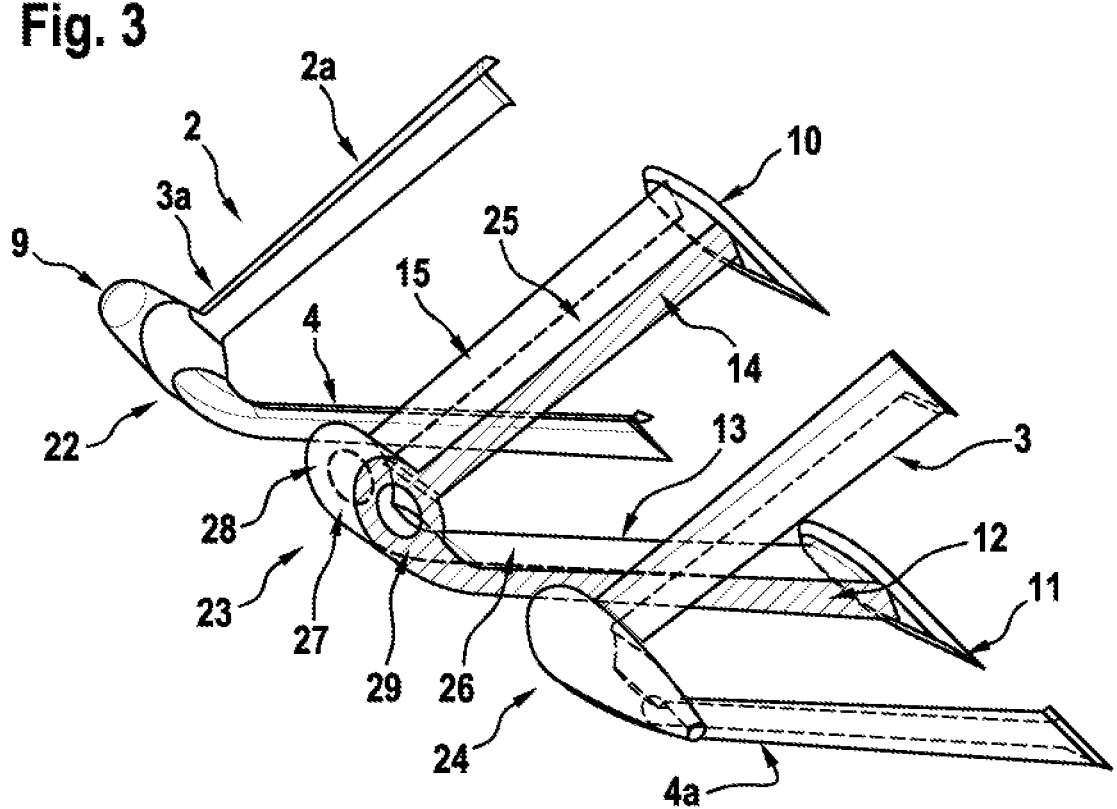
FIG. 3 shows a partly transparent, exploded perspective view of the braced wing of FIG. 2.

FIG. 3 shows the braced wing 2a of FIG. 2 of the braced wings 2 of the braced wing aircraft 1 of FIG. 1 with the upper wing 3a, the lower wing 4a and the transition region 9. According to one aspect, the upper wing rear and front spars 14, 15, the lower wing rear and front spars 12, 13 and the associated rear and front transition spars 29, 28 of the braced wing 2a delimit a main load carrying center box 23 of the braced wing 2a. This main load carrying center box 23 is mounted to a leading portion 22 of the braced wing 2a and a trailing portion 24 of the braced wing 2a.

More specifically, the main load carrying center box 23 preferably comprises an upper wing center box 25 and a lower wing center box 26, as well as a transition box 27. Preferentially, the upper wing center box 25, the lower wing center box 26 and the transition box 27 that interconnects the upper wing center box 25 and the lower wing center box 26 define an internal volume of the braced wing 2a.

According to one aspect, the lower wing rear spar 12, the rear transition spar 29 and the upper wing rear spar 14 define in the longitudinal direction along the longitudinal axis 8 of FIG. 1 of the braced wing aircraft 1 of FIG. 1 a rear wall of the main load carrying center box 23. Likewise, the lower wing front spar 13, the front transition spar 28 and the upper wing front spar 15 form a front wall of the main load carrying center box 23. This main load carrying center box 23 is preferably rigidly attached to the leading portion 22 and the trailing portion 24 of the braced wing 2a.

FIG. 3 further illustrates the arrangement of the lower wing rear spar 12, the rear transition spar 29 and the upper wing rear spar 14 in the single virtually spanned rear spars plane 16a of FIG. 2. Illustratively, the lower wing rear spar 12, the rear transition spar 29 and the upper wing rear spar 14 are implemented as an integrated single one-piece component, which is exemplarily slightly V-shaped without any kinks.

This is exemplarily, by not necessarily, achieved by implementing the rear transition spar 29 in ring-shaped form. An opened C-Shape (i.e. a ring segment) is as well suitable. Furthermore, the lower wing rear spar 12, the upper wing rear spar 14 and the rear transition spar 29 are preferably implemented as flat and straight longitudinal beams.

However, it should be noted that the above explanations refer to the lower wing rear spar 12, the upper wing rear spar 14 and the rear transition spar 29, which are illustratively highlighted in FIG. 3, merely by way of example and representative for all respective spars. In other words, the above explanation preferably likewise applies to the lower wing front spar 13, the front transition spar 28 and the upper wing front spar 15.

FIG. 4 shows the braced wing 2a of FIG. 2 and FIG. 3 of the braced wings 2 of the braced wing aircraft 1 of FIG. 1. In FIG. 4, the braced wing 2a is seen from its outermost tip resp. the transition region 9 in direction of the fuselage 6 of FIG. 1, i.e. in direction of the upper wing root 10 and the lower wing root 11 of the braced wing 2a. In other words, the braced wing 2a is seen in a side view, meaning in direction of a symmetry plane of the braced wing aircraft 1 of FIG. 1 which is defined by the longitudinal axis 8 of FIG. 1 and a vertical aircraft axis 32.

FIG. 4 further illustrates the lower wing rear spar 12, the rear transition spar 29 and the upper wing rear spar 14, which are arranged in the single virtually spanned rear spars plane 16a of FIG. 2, and the lower wing front spar 13, the upper wing front spar 15 and the front transition spar 28, which are arranged in the single virtually spanned front spars plane 17a of FIG. 2. As described above with reference to FIG. 2, the single virtually spanned rear spars plane 16a and the single virtually spanned front spars plane 17a are inclined with respect to the vertical aircraft axis 32.

As described above with reference to FIG. 2, the single virtually spanned rear spars plane 16a is defined by the virtual connection line 16, the lower wing rear spar centroidal axis 18 and the upper wing rear spar centroidal axis 20. Likewise, the single virtually spanned front spars plane 17a is defined by the virtual connection line 17, the lower wing front spar centroidal axis 19 and the upper wing front spar centroidal axis 21.

According to one aspect, the virtual connection line 16 extends between respective upper wing and lower wing rear spar roots, i.e. between the upper wing root 10 and the lower wing root 11. More specifically, the virtual connection line 16 and the virtual connection line 17 preferably extend between respective upper spars root reference points 30 and respective lower spars root reference points 31. The upper spars root reference points 30 are preferably located at the upper wing root 10 and the lower spars root reference points 31 are preferably located at a lower wing root 11. More specifically, the upper spars root reference points 30 are defined by respective intersections of the corresponding upper wing rear and front spars centroidal axes 20, 21 at the upper wing root 10. Similarly, the lower spars root reference points 31 are defined by the intersections of the corresponding lower wing rear and front spar centroidal axes 18, 19 at the lower wing root 11.

According to one aspect, a most relevant impacting parameter on the inclination of the single virtually spanned rear spars plane 16a and the single virtually spanned front spars plane 17a is an associated staggering angle 33 of the braced wing 2a. The staggering angle 33 of the braced wing 2a is the angle that is defined between the virtual connection lines 16, 17 and the vertical aircraft axis 32.

Figure 5:
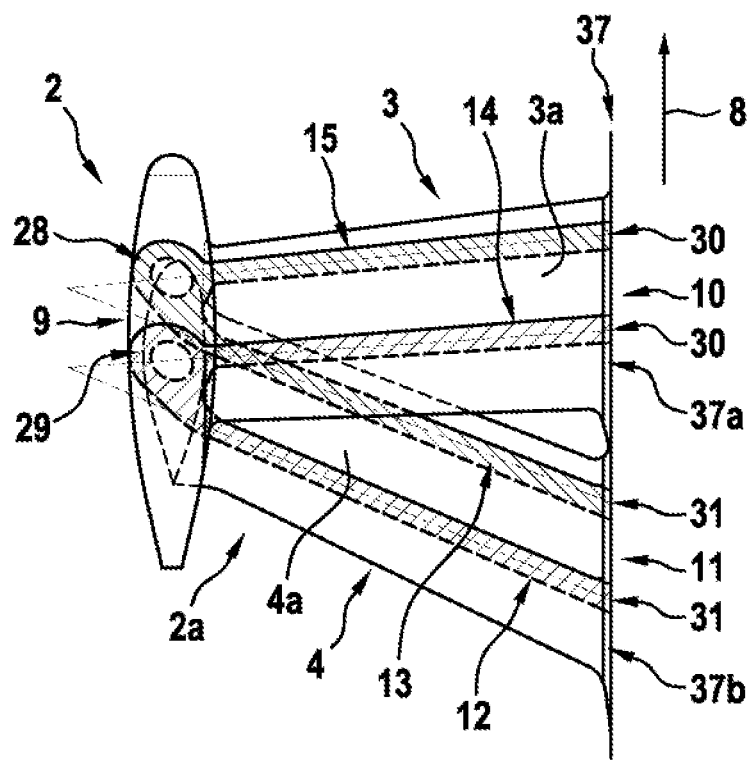
FIG. 5 shows a partly transparent, top view of one of the braced wings of FIG. 1 with a common transverse position of respective wing roots.

FIG. 5 shows the braced wing 2a of FIG. 2 to FIG. 4 of the braced wings 2 of the braced wing aircraft 1 of FIG. 1, with the upper wing root 10 and the lower wing root 11. The upper wing root 10 is located at the transverse position 37a and the lower wing root 11 is located at the transverse position 37b, as explained above with reference to FIG. 1. However, in contrast to FIG. 1 the transverse positions 37a, 37b are now according to one aspect defined as a common transverse position 37, i.e. they are exemplarily aligned in longitudinal direction along the longitudinal axis 8 of the braced wing aircraft 1 of FIG. 1.

However, it should be noted that the arrangement of the upper wing root 10 and the lower wing root 11 on the common transverse position 37 is merely described by way of example and not for limiting the invention thereto. Instead, as shown in FIG. 1, differing transverse positions 37a, 37b are likewise contemplated.

Figure 6:
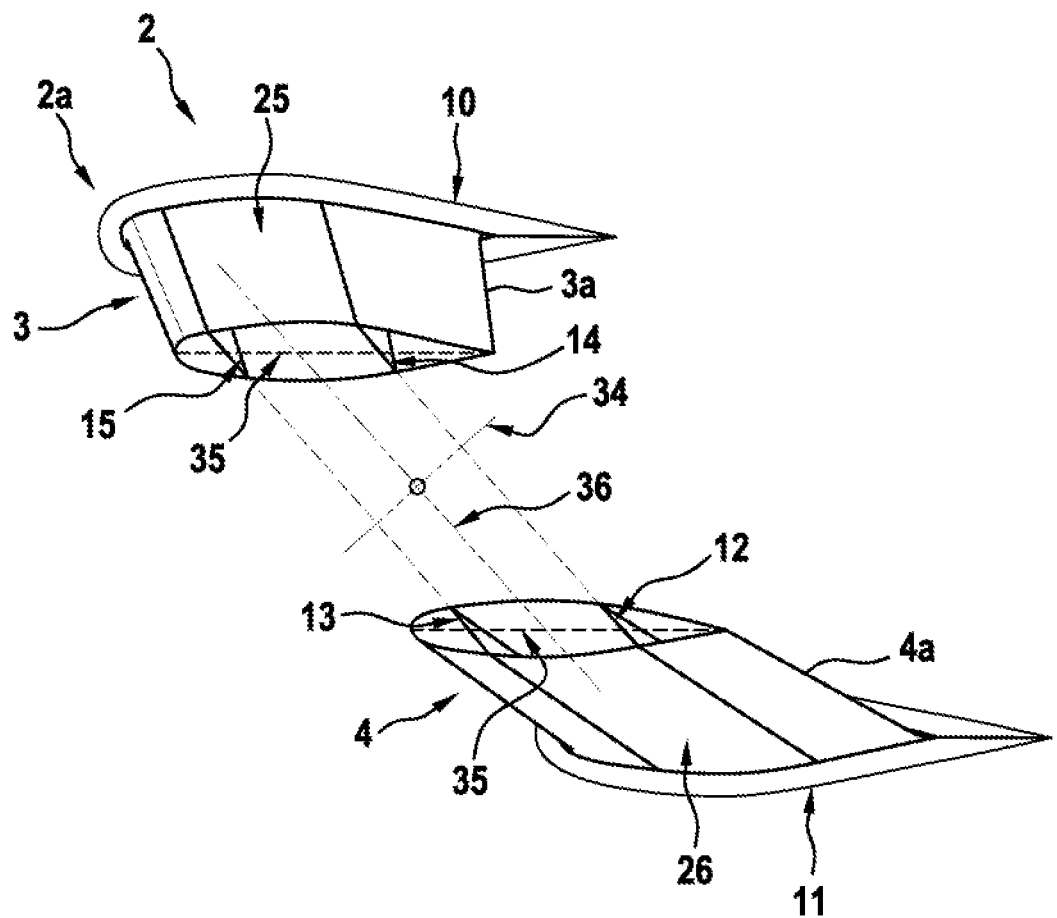
FIG. 6 shows a partly transparent, side cut view of the braced wing of FIG. 4.

FIG. 6 shows the braced wing 2a of FIG. 4 of the braced wings 2 of the braced wing aircraft 1 of FIG. 1 with the upper wing 3a and the lower wing 4a, as well as the upper wing root 10 and the lower wing root 11. In accordance with FIG. 4, the upper wing 3a is provided with the upper wing rear spar 14 and the upper wing front spar 15 and the lower wing 4a is provided with the lower wing rear spar 12 and the lower wing front spar 13. However, in contrast to FIG. 4, the upper and lower wings 3a, 4a are shown in sectional view, i.e. the transition region 9 of FIG. 4 is cut off in the representation of FIG. 6 by a plane parallel and offset from the aircraft's symmetry plane. Thus, an exemplary implementation of the upper wing center box 25 in the upper wing 3a and of the lower wing center box 26 in the lower wing 4a can be illustrated in further detail.

Illustratively, the upper wing 3a and the lower wing 4a respectively comprise a chord line 35. Preferably, the single virtually spanned front and rear spars planes 17a, 16a of FIG. 4 are inclined with respect to the chord line 35.

According to one aspect, the upper wing 3a and the lower wing 4a are configured such that they work together as a mechanical unit so that the resulting principal axes of this mechanical unit are inclined. Accordingly, the reference sign 34 labels a principal axis with largest moment of inertia and the reference sign 36 labels a principal axis with lowest moment of inertia, which is perpendicular to the principal axis 34 with largest moment of inertia.

As can be derived from FIG. 6, there is a comparatively big difference between both principal moments of inertia, wherein the principal axis 36 with the lowest moment of inertia typically represents a weak point of the overall wing architecture of the braced wing 2a as a result of respective relatively small wing chords. Therefore, it is imperative to arrange as much material as possible as far away from the principal axis 36 with lowest moment of inertia as possible. Due to the inclination of the virtual rear spars plane 16a and the virtual front spars plane 17a, the entire webs of the upper wing rear and front spars 14, 15 and the lower wing rear and front spars 12, 13 are almost arranged in parallel to the principal axis 36 with lowest moment of inertia and, hence, optimally placed in terms of maximizing their contribution to the moment of inertia. It is clearly visible from FIG. 6 that the lower wing rear and front spars 12, 13 and the upper wing rear and front spars 14, 15 are inclined with respect to the chord line 35, which is mainly a result of the wing staggering, i.e. of the staggering angle 33 of FIG. 4.

It should again be noted that the above description mainly refers to the braced wing 2a of the braced wings 2 of the braced wing aircraft 1 of FIG. 1. Furthermore, essentially only the respective arrangement of rear spars and/or front spars in the braced wing 2a are described in further detail. This is, however, merely representative for all braced wings and all spar arrangements according to the present invention. In other words, all teachings related to the braced wing 2a may similarly be applied to the braced wing 2b and all teachings that are merely described for either the rear spars arrangement or the front spars arrangement may likewise be applied to the front spars arrangement or rear spars arrangement, vice versa.

Finally, it should be noted that further modifications are also within the common knowledge of the person skilled in the art and, thus, also considered as being part of the present invention.

By way of example, although the lower wing rear and front spars 12, 13, and the upper wing rear and front spars 14, 15, as well as the rear and front transition spars 29, 28 were described with reference to FIG. 2 to FIG. 6 as being flat beams, i.e. flat web beams, they must not necessarily be designed as beam elements with fully flat and closed webs. Instead, they may be provided as framework, as truss construction, as beaded webs, as stiffened webs, as webs with lightening holes or any kind of structural element that is, however, preferably provided with a large in-plane bending stiffness and load capability within the respective virtual plane. Furthermore, the rear and front transition spars 29, 28, which were illustratively described as being ring-shaped and enclosing a whole parameter of the transition region 9 of the braced wing aircraft 1 of FIG. 1, must not necessarily be ring-shaped. Instead, they may respectively only cover a portion of the transition region 9, i.e. as a ring segment. According to the wing spars, the transition regions may use as well any kind of structural design providing a large in-plane bending stiffness and load capability within the respective virtual plane. Furthermore, they can be attached by any suitable means to the upper and lower wing spars, either by means of a continuous or singular attachment.

REFERENCE LIST

1 Braced wing aircraft
1a Fixed wing arrangement
2 Braced wings
2a, 2b Braced wing
3 Upper wings
3a, 3b Upper wing
4 Lower wings
4a, 4b Lower wing
5 Propulsion device
6 Fuselage
7 Empennage
8 Aircraft longitudinal axis
9 Transition region
10 Upper wing root
11 Lower wing root
12 Lower wing rear spar
13 Lower wing front spar
14 Upper wing rear spar
15 Upper wing front spar
16 Virtual rear spar roots connection line
16a Virtual rear spars plane
17 Virtual front spar roots connection line
17a Virtual front spars plane
18 Lower wing rear spar centroidal axis
19 Lower wing front spar centroidal axis
20 Upper wing rear spar centroidal axis
21 Upper wing front spar centroidal axis
22 Braced wing leading portion
23 Main load carrying braced wing center box
24 Braced wing trailing portion
25 Upper wing center box
26 Lower wing center box
27 Braced wing transition box
28 Front transition spar
29 Rear transition spar
30 Upper spars root reference points
31 Lower spars root reference points
32 Aircraft vertical axis
33 Braced wing staggering angle
34 Principal axis with largest moment of inertia
35 Chord line
36 Principal axis with lowest moment of inertia
37 Common transverse position of wing roots
37a Transverse position of upper wing root
37b Transverse position of lower wing root

What is claimed is:

1. A braced wing aircraft with a fuselage and a fixed wing arrangement, the fixed wing arrangement comprising at least two braced wings that are arranged laterally and opposite to each other on the fuselage, each one of the at least two braced wings comprising at least one upper wing and at least one lower wing which are staggered and interconnected at a predetermined transition region, the at least one upper wing being connected to the fuselage at an associated upper wing root and the at least one lower wing being connected to the fuselage at an associated lower wing root, wherein the at least one upper wing comprises at least one upper wing spar that extends from the associated upper wing root to the predetermined transition region, and wherein the at least one lower wing comprises at least one lower wing spar that extends from the predetermined transition region to the associated lower wing root, wherein at least one transition spar is provided at the predetermined transition region, the at least one transition spar connecting the at least one upper wing spar to the at least one lower wing spar, and wherein the at least one upper wing spar, the at least one lower wing spar, and the at least one transition spar are arranged in a single spars plane that is inclined relative to a vertical aircraft axis.

2. The braced wing aircraft of claim 1,
wherein the at least one upper wing spar, the at least one lower wing spar, and the at least one transition spar are integrated into a single one-piece component.

3. The braced wing aircraft of claim 1,
wherein the at least one transition spar is integrated into only one of the at least one upper wing spar and the at least one lower wing spar into a single one-piece component.

4. The braced wing aircraft of claim 1,
wherein the at least one upper wing spar and the at least one lower wing spar are rigidly mechanically attached to the at least one transition spar.

5. The braced wing aircraft of claim 1,
wherein the at least one upper wing and the at least one lower wing respectively comprise a chord line, wherein the single spars plane is inclined with respect to the chord line.

6. The braced wing aircraft of claim 1,
wherein the at least one upper wing comprises an upper wing rear spar and an upper wing front spar, the at least one lower wing comprises a lower wing rear spar and a lower wing front spar, and the at least one transition spar comprises a rear transition spar and a front transition spar.

7. The braced wing aircraft of claim 6,
wherein the upper wing rear spar, the lower wing rear spar and the rear transition spar are arranged in a single rear spars plane that is inclined relative to the vertical aircraft axis, and the upper wing front spar, the lower wing front spar and the front transition spar are arranged in a single front spars plane that is inclined relative to the vertical aircraft axis.

8. The braced wing aircraft of claim 7,
wherein the single virtually spanned rear spars plane and the single virtually spanned front spars plane are arranged in parallel to each other.

9. The braced wing aircraft of claim 7,
wherein the single rear spars plane and the single front spars plane are inclined with respect to each other.

10. The braced wing aircraft of claim 6,
wherein the upper wing rear spar, the lower wing rear spar, the rear transition spar, the upper wing front spar, the lower wing front spar, and the front transition spar delimit a main load carrying center box of an associated one of the at least two braced wings.

11. The braced wing aircraft of claim 10,
wherein the associated one of the at least two braced wings further comprises a leading portion and a trailing portion both of which are rigidly attached to the main load carrying center box.

12. The braced wing aircraft of claim 10,
wherein the upper wing rear spar, the lower wing rear spar, the rear transition spar, the upper wing front spar, the lower wing front spar, and the front transition spar are flat beams with closed webs.

13. The braced wing aircraft of claim 12,
wherein the front transition spar and the rear transition spar are entirely or partially ring-shaped.

14. The braced wing aircraft of claim 1,
wherein a propulsion device is arranged at the predetermined transition region.

15. The braced wing aircraft of claim 1,
wherein being embodied as a rotary wing aircraft with at least one main rotor.

16. A braced wing aircraft with a fuselage and a fixed wing arrangement, the fixed wing arrangement comprising at least two braced wings that are arranged laterally and on opposite sides of the fuselage, each one of the at least two braced wings comprising an upper wing and a lower wing which are staggered and interconnected at a predetermined transition region, the upper wing connected to the fuselage at an associated upper wing root and the lower wing connected to the fuselage at an associated lower wing root, the upper wing comprising an upper wing spar extending from the associated upper wing root to the predetermined transition region, and the lower wing comprising a lower wing spar extending from the predetermined transition region to the associated lower wing root, the predetermined transition region having a transition spar connecting the upper wing spar to the lower wing spar, wherein the upper wing spar, the lower wing spar, and the transition spar are arranged in a single spars plane that is inclined relative to a vertical aircraft axis.

17. The braced wing aircraft of claim 16,
wherein the upper wing and the lower wing respectively comprise a chord line, wherein the single spars plane is inclined relative to the chord line, and wherein the upper wing spar and the lower wing spar are rigidly mechanically attached to the transition spar.

18. The braced wing aircraft of claim 16,
wherein the upper wing spar, the lower wing spar, and the transition spar are integrated into a single one-piece component.

19. The braced wing aircraft of claim 16,
wherein the transition spar is integrated into only one of the upper wing spar and the lower wing spar into a single one-piece component.

* * * * *